(12) United States Patent
Niergarth et al.

(10) Patent No.: US 11,097,850 B2
(45) Date of Patent: *Aug. 24, 2021

(54) ELECTRIC PROPULSION ENGINE FOR AN AIRCRAFT

(71) Applicant: General Electric Company, Schenectady, NY (US)

(72) Inventors: Daniel Alan Niergarth, Cincinnati, OH (US); Randy M. Vondrell, Cincinnati, OH (US); Brandon Wayne Miller, Liberty Township, OH (US); Patrick Michael Marrinan, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,943

(22) Filed: Jul. 5, 2019

(65) Prior Publication Data

US 2019/0322377 A1 Oct. 24, 2019

Related U.S. Application Data

(62) Division of application No. 15/095,249, filed on Apr. 11, 2016, now Pat. No. 10,392,119.

(51) Int. Cl.
*B64D 27/24* (2006.01)
*F04D 25/06* (2006.01)
(Continued)

(52) U.S. Cl.
CPC .............. *B64D 27/24* (2013.01); *B64C 21/06* (2013.01); *B64D 33/02* (2013.01); *F02K 5/00* (2013.01);
(Continued)

(58) Field of Classification Search
CPC .............. B64C 2201/042; B64C 21/06; B64C 2230/04; B64C 15/02; B64D 27/24;
(Continued)

(56) References Cited

U.S. PATENT DOCUMENTS 2,415,104 A 2/1947 Ledwith
2,812,912 A 11/1957 Stevens et al.
(Continued)

FOREIGN PATENT DOCUMENTS

CN 101610949 A 12/2009
CN 104854367 A 8/2015
(Continued)

OTHER PUBLICATIONS http://aviationweek.com/awin/boeing-researches-alternative-propulsion-and-fuel-options, Aviation Week & Space Technology, Jun. 4, 2012.
(Continued)

*Primary Examiner* — Kenneth J Hansen
(74) *Attorney, Agent, or Firm* — Dority & Manning, P.A.

(57) ABSTRACT

A propulsion system for an aircraft includes an electric propulsion engine configured to be mounted to the aircraft at an aft end of the aircraft. The electric propulsion engine includes a power gearbox mechanically coupled to an electric motor. The electric propulsion engine further includes a fan rotatable about a central axis of the electric propulsion engine by the electric motor through the power gearbox. Moreover, the electric propulsion engine includes an attachment assembly for mounting at least one of the electric motor or the power gearbox. The attachment assembly includes a torsional damper for accommodating a torsional vibration of the electric motor or the power gearbox.

12 Claims, 6 Drawing Sheets

(51) Int. Cl.
  F04D 19/00     (2006.01)
  F04D 29/66     (2006.01)
  B64C 21/06     (2006.01)
  B64D 27/02     (2006.01)
  F02K 5/00      (2006.01)
  B64D 33/02     (2006.01)

(52) U.S. Cl.
  CPC ......... F04D 19/002 (2013.01); F04D 25/06 (2013.01); F04D 29/668 (2013.01); B64C 2230/04 (2013.01); B64D 2027/026 (2013.01); B64D 2033/0226 (2013.01); Y02T 50/10 (2013.01); Y02T 50/60 (2013.01)

(58) Field of Classification Search
  CPC ........ B64D 2027/262; B64D 2027/264; B64D 2027/266; B64D 2027/268; B64D 33/02; F16F 1/3821; F16F 15/023; F16F 15/0237; F16F 15/04; F16F 1/506; F16F 15/073; F16F 15/08; F04D 19/002; F04D 29/668; F04D 25/06; F02K 1/80; F02K 5/00; F01D 15/10
  See application file for complete search history.

(56) References Cited

U.S. PATENT DOCUMENTS

| | | |
|---|---|---|
| 3,286,470 A | 11/1966 | Gerlaugh |
| 3,312,448 A | 4/1967 | Hull, Jr. et al. |
| 3,844,110 A | 10/1974 | Widlansky et al. |
| 4,089,493 A | 5/1978 | Paulson |
| 4,583,416 A | 4/1986 | Muller |
| 4,605,185 A | 8/1986 | Reyes |
| 4,913,380 A | 4/1990 | Verdaman et al. |
| 5,927,644 A | 7/1999 | Ellis et al. |
| 6,976,655 B2 | 12/2005 | Thompson |
| 7,267,300 B2 | 9/2007 | Heath et al. |
| 7,387,189 B2 | 6/2008 | James et al. |
| 7,493,754 B2 | 2/2009 | Moniz et al. |
| 7,665,689 B2 | 2/2010 | McComb |
| 7,752,834 B2 | 7/2010 | Addis |
| 7,806,363 B2 | 10/2010 | Udall et al. |
| 7,819,358 B2 | 10/2010 | Belleville |
| 7,905,449 B2 | 3/2011 | Cazals et al. |
| 7,976,273 B2 | 7/2011 | Suciu et al. |
| 8,033,094 B2 | 10/2011 | Suciu et al. |
| 8,099,944 B2 | 1/2012 | Foster et al. |
| 8,109,073 B2 | 2/2012 | Foster et al. |
| 8,128,019 B2 | 3/2012 | Annati et al. |
| 8,162,254 B2 | 4/2012 | Roche |
| 8,220,739 B2 | 7/2012 | Cazals |
| 8,226,040 B2 | 7/2012 | Neto |
| 8,291,716 B2 | 10/2012 | Foster et al. |
| 8,317,126 B2 | 11/2012 | Harris et al. |
| 8,469,306 B2 | 6/2013 | Kuhn, Jr. |
| 8,492,920 B2 | 7/2013 | Huang et al. |
| 8,549,833 B2 | 10/2013 | Hyde et al. |
| 8,552,575 B2 | 10/2013 | Teets et al. |
| 8,596,036 B2 | 12/2013 | Hyde et al. |
| 8,640,439 B2 | 2/2014 | Hoffjann et al. |
| 8,672,263 B2 | 3/2014 | Stolte |
| 8,684,304 B2 | 4/2014 | Burns et al. |
| 8,723,349 B2 | 5/2014 | Huang et al. |
| 8,723,385 B2 | 5/2014 | Jia et al. |
| 8,857,191 B2 | 10/2014 | Hyde et al. |
| 8,890,343 B2 | 11/2014 | Bulin et al. |
| 8,939,399 B2 | 1/2015 | Kouros et al. |
| 8,998,580 B2 | 4/2015 | Quiroz-Hernandez |
| 9,038,398 B2 | 5/2015 | Suciu et al. |
| 9,797,470 B2 | 10/2017 | Lorenz et al. |
| 2010/0038473 A1* | 2/2010 | Schneider .............. B64D 35/00 244/60 |
| 2010/0207007 A1* | 8/2010 | Cottrell ................ F16F 15/023 248/638 |
| 2012/0119020 A1 | 5/2012 | Burns et al. |
| 2012/0153076 A1 | 6/2012 | Burns et al. |
| 2012/0209456 A1 | 8/2012 | Harmon et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0088019 A1 | 4/2013 | Huang et al. |
| 2013/0099065 A1 | 4/2013 | Stuhlberger |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0306024 A1 | 11/2013 | Rolt |
| 2014/0010652 A1 | 1/2014 | Suntharalingam et al. |
| 2014/0060995 A1 | 3/2014 | Anderson et al. |
| 2014/0151495 A1 | 6/2014 | Kuhl, Jr. |
| 2014/0250861 A1 | 9/2014 | Eames |
| 2014/0283519 A1 | 9/2014 | Mariotto et al. |
| 2014/0290208 A1 | 10/2014 | Rechain et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0013306 A1 | 1/2015 | Shelley |
| 2015/0028594 A1 | 1/2015 | Mariotto |
| 2015/0151844 A1 | 6/2015 | Anton et al. |
| 2015/0380999 A1 | 12/2015 | Joshi et al. |

FOREIGN PATENT DOCUMENTS

| | | | |
|---|---|---|---|
| CN | 105416573 A | 3/2016 | |
| EP | 0855536 A1 | 7/1998 | |
| EP | 2562086 A2 | 2/2013 | |
| EP | 2774853 A1 | 9/2014 | |
| GB | 2489311 A | 9/2012 | |
| JP | 2013-224589 A | 10/2013 | |
| WO | WO2010/020199 A1 | 2/2010 | |
| WO | WO-2010020199 A1 * | 2/2010 | ............. B64D 27/24 |
| WO | WO2014/072615 A1 | 5/2014 | |

OTHER PUBLICATIONS

Bradley et al., "Subsonic Ultra Green Aircraft Research,Phase II: N+4 Advanced Concept Development," NASA/CR-2012-217556, May 2012.

European Search Report Corresponding to EP171658107 dated Sep. 19, 2017.

Japanese Notification Reason for Refusal Corresponding to JP2017-069483 dated May 22, 2018.

Combined Chinese Office Action and Search Report Corresponding to Application No. 201710232510 dated Aug. 27, 2019.

* cited by examiner

ELECTRIC PROPULSION ENGINE FOR AN AIRCRAFT

CROSS-REFERENCE TO RELATED APPLICATIONS

This application is a Divisional application of U.S. application Ser. No. 15/095,249, filed Apr. 11, 2016, which is hereby incorporated by reference in its entirety.

FIELD OF THE INVENTION

The present subject matter relates generally to an aircraft propulsion system including an electric propulsion engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines, also has an effect on the net propulsive thrust of the aircraft. A total amount of drag on the aircraft, including skin friction, form, and induced drag, is generally proportional to a difference between a freestream velocity of air approaching the aircraft and an average velocity of a wake downstream from the aircraft that is produced due to the drag on the aircraft.

Systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines upstream from a fan section of the turbofan jet engines. Although this configuration can reduce drag by reenergizing the boundary layer airflow downstream from the aircraft, the relatively slow moving flow of air from the boundary layer entering the turbofan jet engine generally has a nonuniform or distorted velocity profile. As a result, such turbofan jet engines can experience an efficiency loss minimizing or negating any benefits of reduced drag on the aircraft.

Accordingly, a propulsion system including one or more components for reducing an amount of drag on the aircraft would be useful. More particularly, a propulsion system including one or more components for reducing an amount of drag on the aircraft without causing any substantial decreases in an efficiency of the aircraft engines would be especially beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a propulsion system is provided for an aircraft having a structural member. The propulsion system includes an electric propulsion engine configured to be mounted to the aircraft. The electric propulsion engine defines a central axis and includes an electric motor, and a power gearbox mechanically coupled to the electric motor. The electric propulsion engine additionally includes a fan rotatable about the central axis of the electric propulsion engine by the electric motor through the power gearbox, and an attachment assembly for mounting at least one of the electric motor or the power gearbox. The attachment assembly includes a torsional damper for accommodating torsional vibration of the electric motor or the power gearbox.

In another exemplary embodiment of the present disclosure, a boundary layer ingestion fan is provided for an aircraft having an aft end and a structural member. The boundary layer ingestion fan includes an electric motor, a power gearbox mechanically coupled to the electric motor, and a fan rotatable about the central axis of the boundary layer ingestion fan by the electric motor through the power gearbox. The boundary layer ingestion fan additionally includes an attachment assembly for mounting at least one of the electric motor or the power gearbox, the attachment assembly including a torsional damper for accommodating torsional vibration of the electric motor or the power gearbox.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft.

The present disclosure provides for an aft engine including an electric motor, a power gearbox, and a fan. The inventors the present disclosure have discovered that it may be necessary to mount the electric motor and/or the power gearbox so as to accommodate vibrations and other forces that the inventors have found may act on such components during operation of the aft engine. Additionally, the inventors of the present disclosure have discovered that it may be necessary to include a flexible element in a driveshaft connecting the electric motor and power gearbox to accommodate a potential misalignment of these components that the inventors have found may form during operation of the aft engine.

Figure 1:
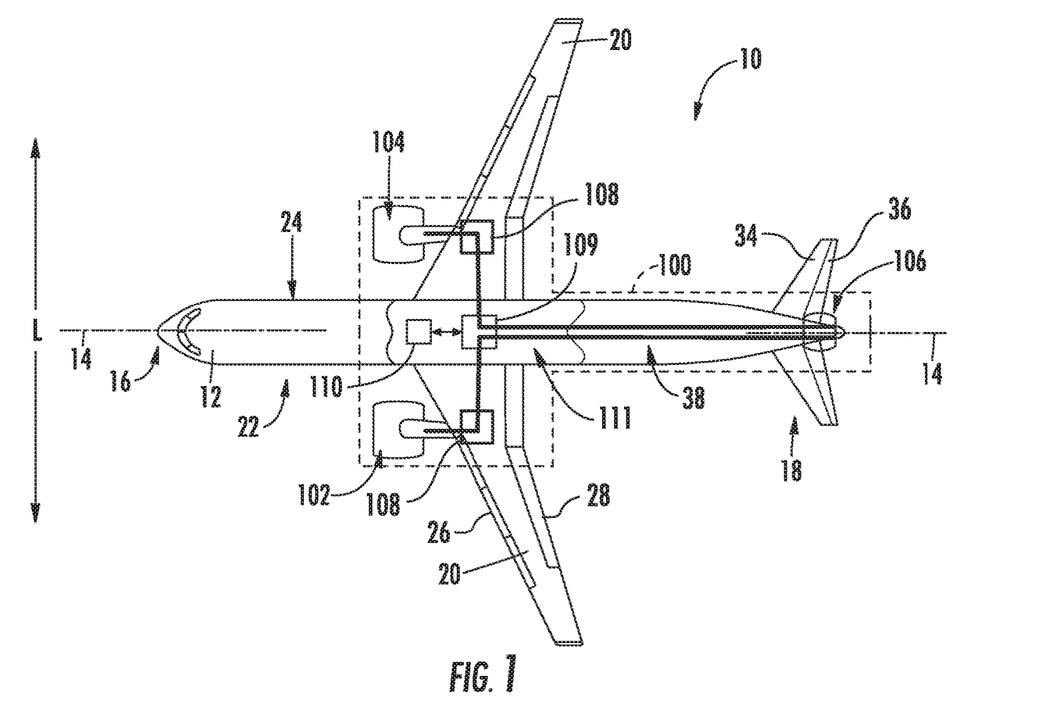
FIG. 1 is a top view of an aircraft according to various exemplary embodiments of the present disclosure.
Figure 2:
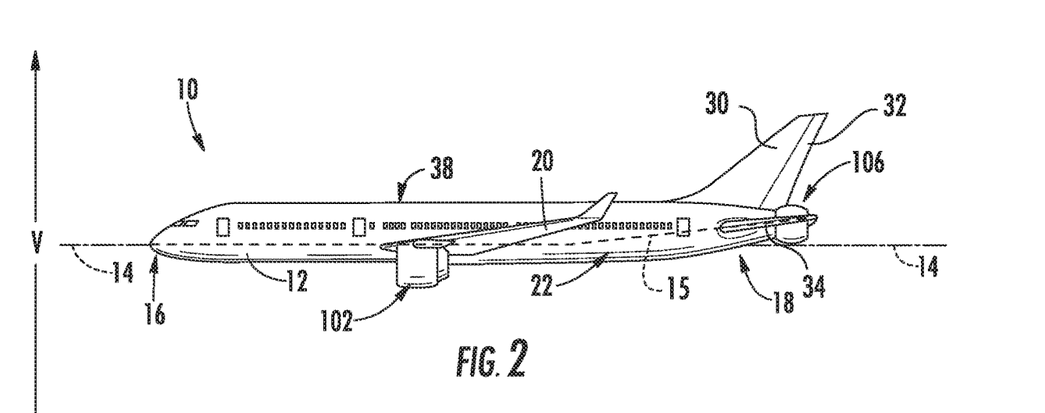
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes an aircraft engine, or rather a pair of aircraft engines, each configured to be mounted to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough. It should be appreciated, however, that in other embodiments the electric propulsion engine may be configured in any other suitable manner, and may not necessarily be configured as an aft fan or as a BLI fan.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric communication bus 111, such that the electric generator 108 may be in electrical communication with the BLI fan 106 and/or the energy storage device 110, and such that the electric generator 108 may provide electrical power to one or both of the energy storage device 110 or the BLI fan 106. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location proximate the aft end 18. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a POD engine, or a "podded engine." Further, in still other embodiments, the electric propulsion engine may be incorporated into a wing of the aircraft 10, and thus may be configured as a "blended wing engine," or may be mounted in an under-wing configuration. Further, in other embodiments, the propulsion system 100 may not include, e.g., the power conditioner 109 and/or the energy storage device 110, and instead the generator(s) 108 may be directly connected to the BLI fan 106.

Figure 3:
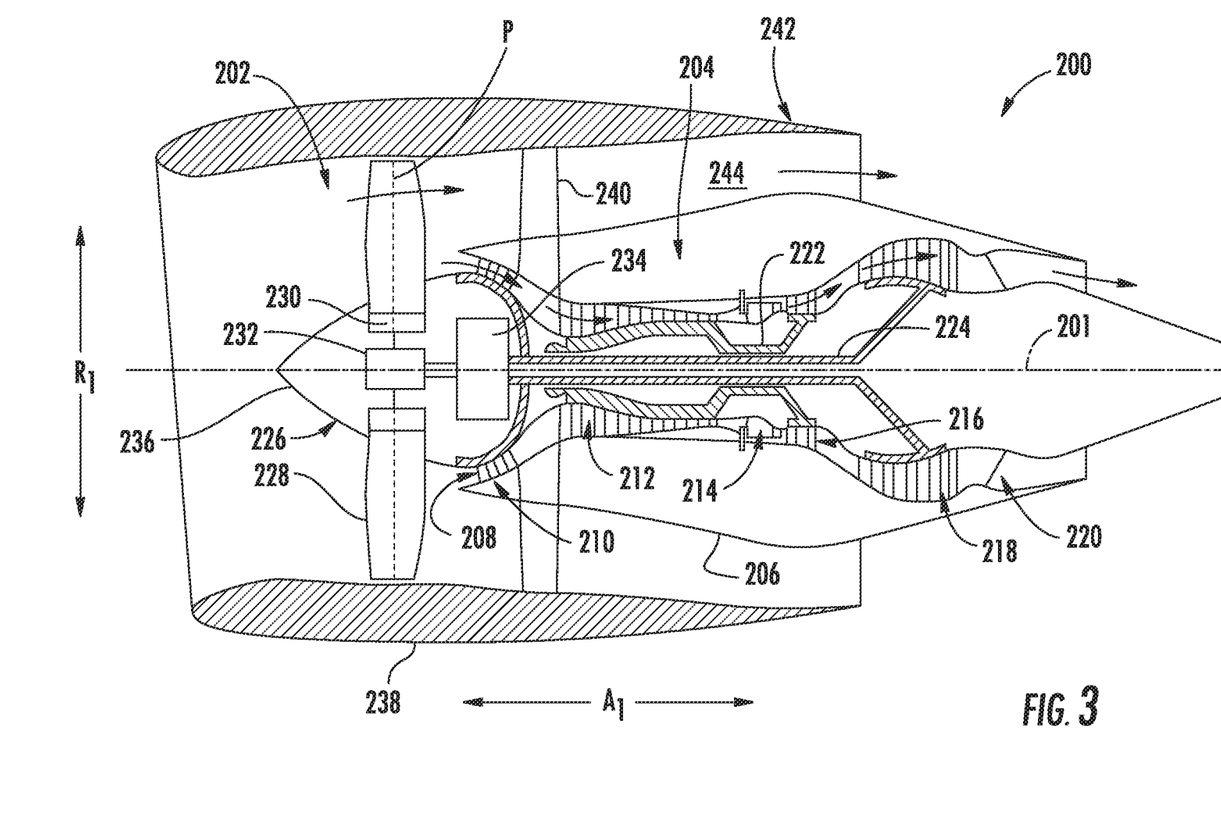
FIG. 3 is a schematic, cross-sectional view of a gas turbine engine mounted to the exemplary aircraft of FIG. 1.

Referring now to FIG. 3, in at least certain embodiments, the jet engines 102, 104 may be configured as high-bypass turbofan jet engines. FIG. 3 is a schematic cross-sectional view of an exemplary high-bypass turbofan jet engine 200, herein referred to as "turbofan 200." In various embodiments, the turbofan 200 may be representative of jet engines 102, 104. As shown in FIG. 3, the turbofan 200 defines an axial direction A1 (extending parallel to a longitudinal centerline 201 provided for reference) and a radial direction R1. In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R1. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. It should be appreciated that the nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

It should be appreciated, however, that the exemplary turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine, such as a turboprop engine, turbojet engine, internal combustion engine, etc.

Figure 4:
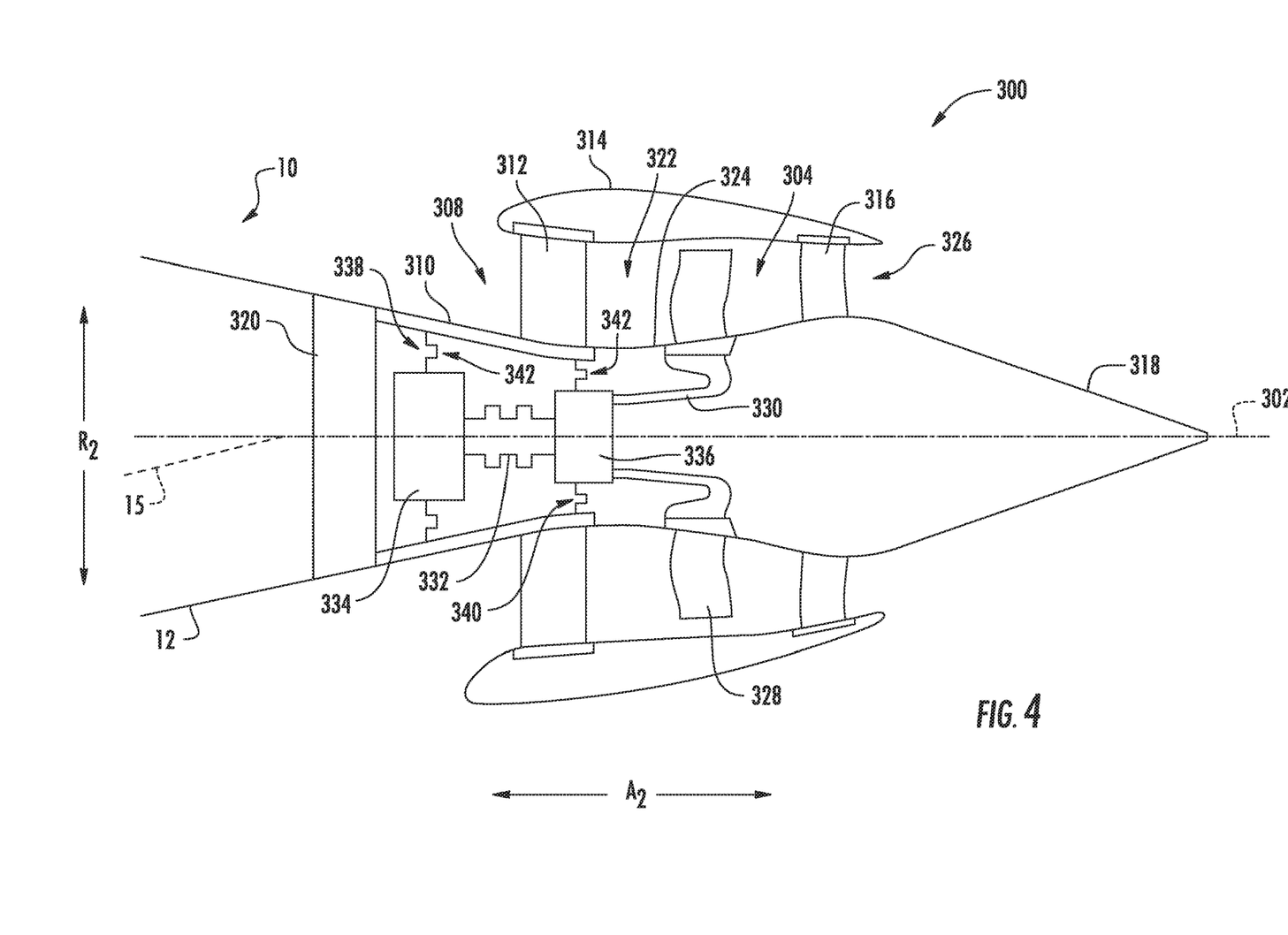
FIG. 4 is a schematic, cross-sectional view of an aft engine in accordance with an exemplary embodiment of the present disclosure.

Referring now to FIG. 4, a schematic, cross-sectional side view of an electric propulsion engine in accordance with various embodiments of the present disclosure is provided. The electric propulsion engine depicted is mounted to an aircraft 10 at an aft end 18 of the aircraft 10 and is configured to ingest a boundary layer air. Accordingly, for the embodiment depicted, the electric propulsion engine is configured as a boundary layer ingestion (BLI), aft fan (referred to hereinafter as "BLI fan 300"). The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2. It should be appreciated, however, that although the electric propulsion engine is described in the context of a aft-mounted, BLI fan, in other embodiments of the present disclosure, the electric propulsion engine may instead by configured in any other suitable manner. For example, in other embodiments, the electric propulsion engine may not be an aft-mounted engine, and may be configured to ingest free-stream air.

As shown in FIG. 4, the BLI fan 300 defines an axial direction A2 extending along a longitudinal centerline axis 302 that extends therethrough for reference, as well as a radial direction R2 and a circumferential direction C2 (a direction extending about the axial direction A2, not shown). Additionally, the aircraft 10 defines a mean line 15 extending therethrough.

In general, the BLI fan 300 includes a fan 304 rotatable about the centerline axis 302 and a fan frame 308. The fan frame 308 is configured for mounting the BLI fan 300 to the aircraft 10, and for the embodiment depicted generally includes an inner frame support 310, a plurality of forward support members 312, an outer nacelle 314, a plurality of aft support members 316, and a tail cone 318. As is depicted, the inner frame support 310 is attached to a bulkhead 320 of the fuselage 12. The plurality of forward support members 312 are attached to the inner frame support 310 and extend outward generally along the radial direction R2 to the nacelle 314. The nacelle 314 defines an airflow passage 322 with an inner casing 324 of the BLI fan 300, and at least partially surrounds the fan 304. Further, for the embodiment depicted, the nacelle 314 extends substantially three hundred and sixty degrees (360°) around the mean line 15 of the aircraft 10. The plurality of aft support members 316 also extend generally along the radial direction R2 from, and structurally connect, the nacelle 314 to the tail cone 318.

In certain embodiments, the forward support members 312 and the aft support members 316 may each be generally spaced along the circumferential direction C2 of the BLI fan 300. Additionally, in certain embodiments the forward support members 312 may be generally configured as inlet guide vanes and the aft support members 316 may generally be configured as outlet guide vanes. If configured in such a manner, the forward and aft support members 312, 316 may direct and/or condition an airflow through the airflow passage 322 of the BLI fan 300. Notably, one or both of the forward support members 312 or aft support members 316 may additionally be configured as variable guide vanes. For example, the support member may include a flap (not shown) positioned at an aft end of the support member for directing a flow of air across the support member.

It should be appreciated, however, that in other exemplary embodiments, the fan frame 308 may instead include any other suitable configuration and, e.g., may not include each of the components depicted and described above. Alternatively, the fan frame 308 may include any other suitable components not depicted or described above.

The BLI fan 300 additionally defines a nozzle 326 between the nacelle 314 and the tail cone 318. The nozzle 326 may be configured to generate an amount of thrust from the air flowing therethrough, and the tail cone 318 may be shaped to minimize an amount of drag on the BLI fan 300. However, in other embodiments, the tail cone 318 may have any other shape and may, e.g., end forward of an aft end of the nacelle 314 such that the tail cone 318 is enclosed by the nacelle 314 at an aft end. Additionally, in other embodiments, the BLI fan 300 may not be configured to generate any measureable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring still to FIG. 4, the fan 304 includes a plurality of fan blades 328 and a fan shaft 330. The plurality of fan blades 328 are attached to the fan shaft 330 and spaced generally along the circumferential direction C2 of the BLI fan 300. As depicted, the plurality fan blades 328 are, for the embodiment depicted, at least partially enclosed by the nacelle 314.

In certain exemplary embodiments, the plurality of fan blades 328 may be attached in a fixed manner to the fan shaft 330, or alternatively, the plurality of fan blades 328 may be rotatably attached to the fan shaft 330. For example, the plurality of fan blades 328 may be attached to the fan shaft 330 such that a pitch of each of the plurality of fan blades 328 may be changed, e.g., in unison, by a pitch change mechanism (not shown). Changing the pitch of the plurality of fan blades 328 may increase an efficiency of the BLI fan 300 and/or may allow the BLI fan 300 to achieve a desired thrust profile. With such an exemplary embodiment, the BLI fan 300 may be referred to as a variable pitch BLI fan.

Moreover, for the embodiment depicted, the fan 304 is rotatable about the centerline axis 302 of the BLI fan 300 by an electric motor 336. More particularly, for the embodiment depicted, the BLI fan 300 additionally includes a power gearbox 338 mechanically coupled to the electric motor 336, with the fan 304 mechanically coupled to the power gearbox 338. For example, for the embodiment depicted, the fan shaft 330 extends to and is coupled to the power gearbox 338, and a driveshaft 340 of the electric motor 336 extends to and is also coupled to the power gearbox 338. Accordingly, for the embodiment depicted, the fan 304 is rotatable about the central axis 302 of the BLI fan 300 by the electric motor 336 through the power gearbox 338.

The power gearbox 338 may include any type of gearing system for altering a rotational speed between the driveshaft 340 and the fan shaft 330. For example, the power gearbox 338 may be configured as a star gear train, a planetary gear train, or any other suitable gear train configuration. Additionally, the power gearbox 338 may define a gear ratio, which as used herein, refers to a ratio of a rotational speed of the driveshaft 340 to a rotational speed of the fan shaft 330.

Referring still to the exemplary embodiment of FIG. 4, the electric motor 334 is located forward of the power gearbox 336, and the power gearbox 336 is, in turn, located forward of the fan 304. Such a configuration may allow the electric motor 334 to advantageously be positioned for receiving electrical power during operation. Notably, in certain exemplary embodiments, the BLI fan 300 may be configured with a gas-electric propulsion system, such as the gas-electric propulsion system 100 described above with reference to FIGS. 1 and 2. In such an embodiment, the electric motor 334 may receive power from one or both of an energy storage device or an electric generator—such as the energy storage device 110 or electric generator 108 of FIGS. 1 and 2.

Furthermore, referring still to FIG. 4, the BLI fan 300 additionally includes an attachment assembly for mounting at least one of the electric motor 334 or the power gearbox 336, or more particularly, for mounting at least one of the electric motor 334 or the power gearbox 336 to at least one of the fan frame 308 or a structural member of the aircraft (e.g., the bulkhead 320 of the aircraft 10). As is also depicted in FIG. 4, and as will be discussed in greater detail below, the driveshaft 332 extends between the electric motor 334 and the power gearbox 336 and includes a flexible element 335 for accommodating a misalignment of the electric motor 334 and the power gearbox 336.

Specifically, for the embodiment depicted, the BLI fan 300 includes a first attachment assembly 338 for mounting the electric motor 334 to the fan frame 308 and a second attachment assembly 340 for mounting the power gearbox 336 also to the fan frame 308. Notably, each of the first and second attachment assemblies 338, 340 includes a torsional damper 342 for accommodating vibration, including torsional vibration, of the electric motor 334 or the power gearbox 336 during operation of the BLI fan 300. As used herein, the term "torsional vibration" may refer to vibration or other forces exerted along the circumferential direction C2. More specifically, the inventors of the present disclosure have determined that utilizing electric machines (e.g., electric motors) with electric propulsion engines (such as the BLI fan 300 depicted) may generate torque oscillations, or "ripple," due to pole passing frequencies. These torque oscillations may drive undesirable dynamic frequency responses of proximally mounted hardware. Accordingly, mitigating the torsional vibrations (or torque oscillations) can be particularly desirable for the disclosed electric propulsion devices.

Figure 5:
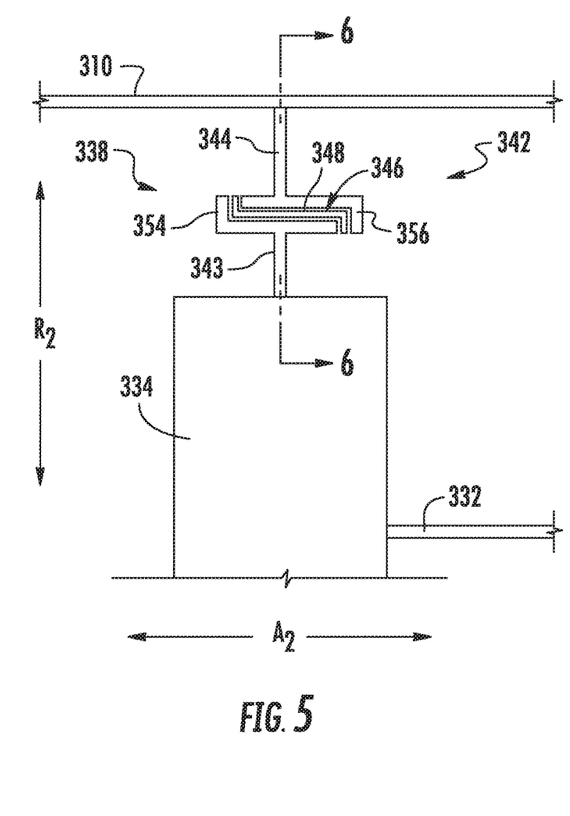
FIG. 5 is a close-up, schematic, cross-sectional view of an attachment assembly in accordance with an exemplary embodiment of the present disclosure as may be incorporated in the exemplary aft engine of FIG. 4.
Figure 6:
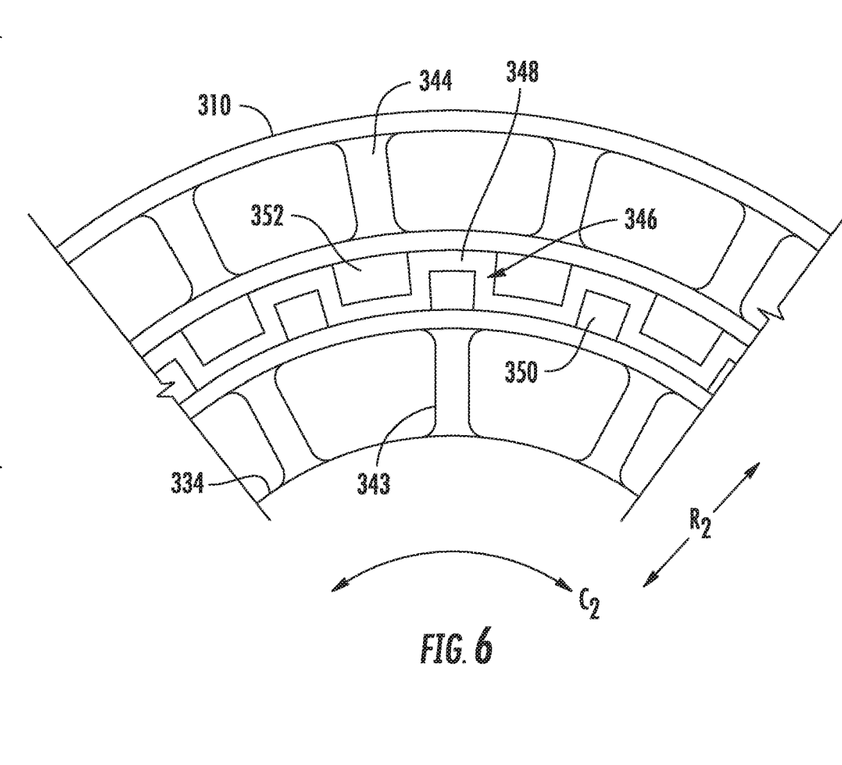
FIG. 6 is a cross-sectional view of the exemplary attachment assembly of FIG. 5, taken along Line 6-6 in FIG. 5.

Referring now to FIGS. 5 and 6, close-up views of an electric propulsion device including a first attachment assembly 338 mounting an electric motor 334 to a fan frame 308 are provided. In certain exemplary embodiments, the electric propulsion device may be a BLI fan 300 configured in substantially the same manner as the exemplary BLI fan 300 described above with reference to FIG. 4, and thus the same or similar numbering may refer to the same or similar part. However, in other embodiments, the electric propulsion device may be configured in any other suitable manner.

FIG. 5 provides a close-up, schematic view of the first attachment assembly 338 of the exemplary BLI fan 300; and FIG. 6 provides a close-up, schematic view of the first attachment assembly 338 of the exemplary BLI fan 300, taken along Line 6-6 of FIG. 5. As depicted, the exemplary BLI fan 300 defines an axial direction A2, a radial direction R2, and a circumferential direction C2 (see FIG. 6). Additionally, the BLI fan 300 generally includes a fan frame 308 and an electric motor 334 mechanically coupled to a driveshaft 332. The first attachment assembly 338 extends between the electric motor 334 to the fan frame 308, and mounts the electric motor 334 to the fan frame 308. The first attachment assembly 338 includes a torsional damper 342 for accommodating torsional vibration of the electric motor 334 relative to the fan frame 308 during operation of the BLI fan 300.

Particularly for the embodiment depicted, the torsional damper 342 of the attachment assembly provides dampening of the electric motor 334 along the axial direction A2 and the radial direction R2, in addition to along the circumferential direction C2 of the BLI fan 300. For example, the exemplary first attachment assembly 338 depicted includes a first attachment member 343 connected to the electric motor 334 and a second attachment member 344 connected to the fan frame 308. The first attachment member 343 and a second attachment member 344 together define an attachment interface 346 made up of a plurality of interdigitated members with a dampening material 348 positioned at least partially between the interdigitated members.

For example, referring specifically to FIG. 6, the first attachment member 343 includes a plurality of circumferentially spaced teeth 350 extending outwardly generally along the radial direction R2. Similarly, the second attachment member 344 includes a corresponding and complementary plurality of circumferentially spaced teeth 352 extending inwardly generally along the radial direction R2. The teeth 350 of the first attachment member 343 extend into circumferential gaps defined between adjacent teeth 352 of the second attachment member 344, and conversely, the teeth 352 of the second attachment member 344 extend into circumferential gaps defined between adjacent teeth 350 of the first attachment member 343. Additionally, the dampening material 348 is positioned between the teeth 350 of the first attachment member 343 and the teeth 352 of the second attachment member 344.

Referring again to FIG. 5, the first attachment member 343 includes a forward lip 354 extending outwardly generally along the radial direction R2, and the second attachment member 344 includes an aft lip 356 extending inwardly generally along the radial direction R2. The forward lip 354 of the first attachment member 343 is configured to interface with the second attachment member 344, and the aft lip 356 of the second attachment member 344 is configured to interface with the first attachment member 343. Such a configuration may prevent movement of the first attachment member 343 relative to the second attachment member 344 along the axial direction A2 more than a predetermined amount. Notably, the first attachment assembly 338 further includes dampening material 348 positioned between the forward lip 354 and the second attachment member 344, and also between the aft lip 356 and the first attachment member 343. However, in other embodiments, the first attachment assembly 338 may instead, or in addition, include any other means for limiting movement along the axial direction A2. For example, in other exemplary embodiments, the first attachment assembly 338 may include one or more pins, bolts, etc. extending generally along the radial direction R2 between the first attachment member 343 and the second attachment member 344. The one or more pins, bolts, etc. may be enclosed within the dampening material 348 to allow for dampening along the axial direction A2.

The dampening material 348 may be any material suitable for absorbing force and/or vibration. For example, the dampening material 348 may be any resilient material, such as an elastomeric material. However, in other embodiments, any other suitable material or configuration may be utilized. For example, in other embodiments, the torsional damper 342 may utilize a viscous damping or pneumatic damping. For example, in certain embodiments, the dampening material 348 may be oil, such that torsional damper 342 includes a squeeze film damper, or other similar structure.

As stated, the torsional damper 342 of the exemplary first attachment assembly 338 depicted may be capable of absorbing forces along the axial direction A2, the radial direction R2, and the circumferential direction C2 of the BLI fan 300. Accordingly, an attachment assembly in accordance with one or more embodiments of the present disclosure may be capable of extending a life of, e.g., the electric motor 334, by reducing an amount of stress or strain on the electric motor 334 (or proximally mounted components).

Figure 7:
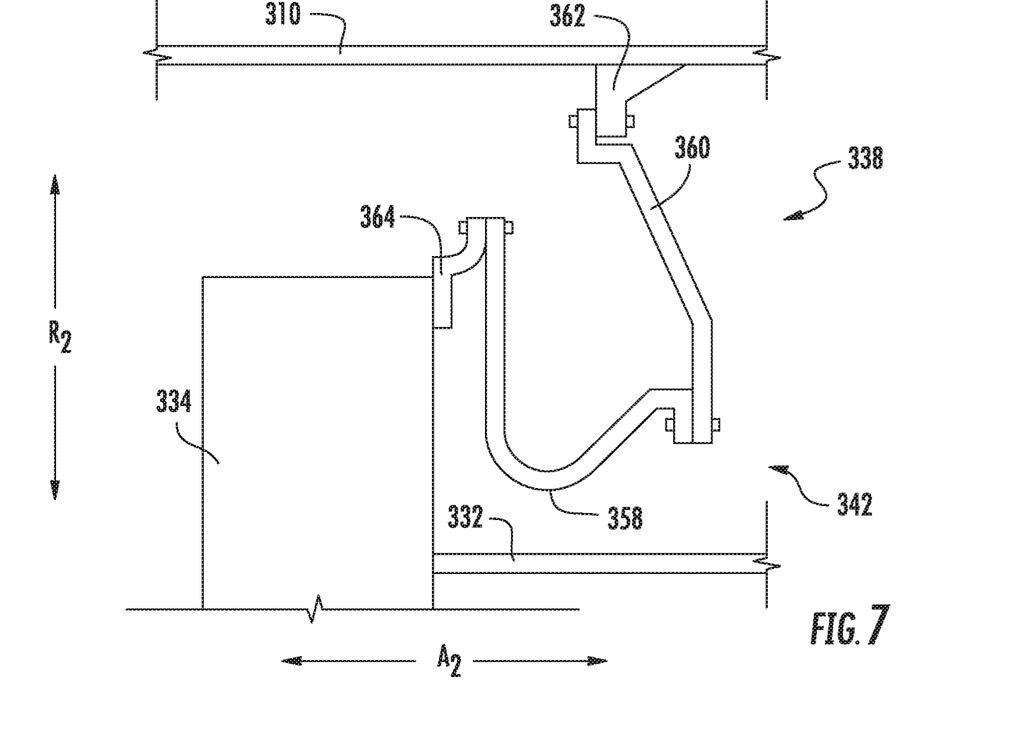
FIG. 7 is a close-up, schematic, cross-sectional view of an attachment assembly in accordance with another exemplary embodiment of the present disclosure as may be incorporated in the exemplary aft engine of FIG. 4.

Referring now to FIG. 7, a close-up view is provided of an electric propulsion engine in accordance with another exemplary embodiment of the present disclosure including a first attachment assembly 338 mounting an electric motor 334 to a fan frame 308. The exemplary electric propulsion engine depicted in FIG. 7 may be a BLI fan 300 configured in substantially the same manner as the exemplary BLI fan 300 described above with reference to FIG. 4. Accordingly, the same or similar numbering may refer to the same or similar part. However, in other embodiments, the electric propulsion device may be configured in any other suitable manner.

The exemplary BLI fan 300 of FIG. 7 defines an axial direction A2, a radial direction R2, and a circumferential direction C2 (not shown). Additionally, the BLI fan 300 generally includes a fan frame 308 and an electric motor 334 mechanically coupled to a driveshaft 332. The first attachment assembly 338 extends between the electric motor 334 and the fan frame 308, and mounts the electric motor 334 to the fan frame 308. Additionally, the exemplary first attachment assembly 338 includes a torsional damper 342 for accommodating torsional vibration of the electric motor 334 relative to the fan frame 308 during operation of the BLI fan 300.

Additionally, the torsional damper 342 of the first attachment assembly 338 provides dampening of the electric motor 334 along the axial direction A2 and the radial direction R2, in addition to along the circumferential direction C2 of the BLI fan 300. For the embodiment depicted, the torsional damper 342 comprises one or more flexible couplings. Specifically, the exemplary torsional damper 342 includes a plurality of flexible couplings spaced along the circumferential direction C2 of the BLI fan 300 (not shown). As is depicted, each flexible coupling includes a flexible spring member 358 designed to bend or flex to absorb a force between the electric motor 334 and fan frame 308, and an extension member 360 extending between and connecting a bracket 362 on the fan frame 308 to the spring member 358. The spring member 358, in turn, extends between the extension member 360 and a bracket 364 on the electric motor 334. The spring member 358 may be formed of a relatively resilient material capable of bending or flexing in response to a force. Accordingly, the spring member 358 may absorb a force along the radial direction R2, along the axial direction A2, and along the circumferential direction C2 of the BLI fan 300.

Figure 8:
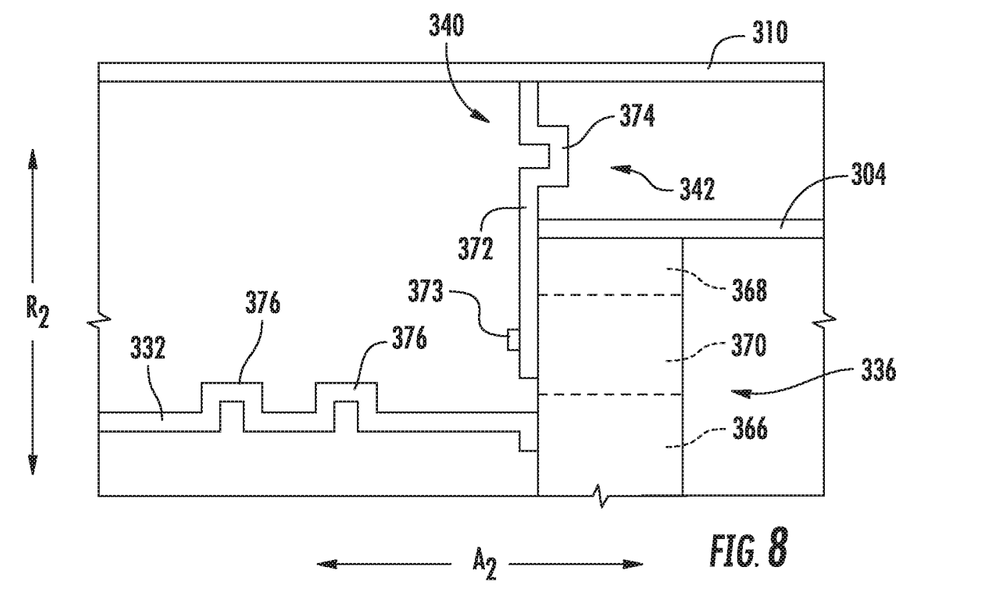
FIG. 8 is a close-up, schematic, cross-sectional view of an attachment assembly in accordance with still another exemplary embodiment of the present disclosure, along with a driveshaft in accordance with an exemplary embodiment of the present disclosure, each as may be incorporated in the exemplary aft engine of FIG. 4.

Referring now to FIG. 8, a close-up view is provided of an electric propulsion engine including a second attachment assembly 340 mounting a power gearbox 336 to a fan frame 308 in accordance with an exemplary embodiment of the present disclosure. The exemplary electric propulsion engine depicted in FIG. 7 may be a BLI fan 300 configured in substantially the same manner as the exemplary BLI fan 300 described above with reference to FIG. 4. Accordingly, the same or similar numbering may refer to the same or similar part. However, in other embodiments, the electric propulsion device may be configured in any other suitable manner.

The exemplary BLI fan 300 depicted in FIG. 8 defines an axial direction A2, a radial direction R2, and a circumferential direction C2 (not shown). Additionally, the BLI fan 300 generally includes an electric motor 334 (not shown) mechanically coupled to a driveshaft 332, the driveshaft 332 extending to and mechanically coupled to a power gearbox 336. The BLI fan 300 additionally includes a fan frame 308 and a second attachment assembly 340 mounting the power gearbox 336 to the fan frame 308. The second attachment assembly 340 extends between the power gearbox 336 and the fan frame 308, and mounts the power gearbox 336 to the fan frame 308.

For the embodiment depicted, the power gearbox 336 is configured as a planetary gearbox generally including a radially inner sun gear 366, a radially outer ring gear 368, and a plurality of planet gears 370 position therebetween. The driveshaft 332 is attached to and rotates with the sun gear 366, while the fan 304 shaft is attached to and rotates with the ring gear 368. The power gearbox 336 is mounted through the plurality of planet gears 370. Specifically, the second attachment assembly 340 includes one or more attachment members 372 that are connected to the planet gears 370 through one or more pins 373 (which may allow the planet gears 370 to rotate about the pins 373 relative to the attachment members 372).

Additionally, the second attachment assembly 340 includes a torsional damper 342 for accommodating vibration of the power gearbox 336 relative to the fan frame 308 during operation of the BLI fan 300. For the embodiment depicted, the torsional damper 342 is configured as a bellow 374 formed in the attachment member 372 of the second attachment assembly 340, located between the power gearbox 336 and the fan frame 308. In certain embodiments, the attachment assembly may include a plurality of attachment members 372 spaced along the circumferential direction C2 for mounting the power gearbox 336 to the fan frame 308. Each of these attachment members 372 may include a bellow 374 or other suitable torsional damper 342. Notably, the exemplary torsional damper 342 depicted may accommodate vibrations along the axial direction A2 and a radial direction R2, in addition to along the circumferential direction C2.

As discussed, inclusion of a torsional damper 342 in the first and second attachment assemblies 338, 340 may allow for an increase lifespan of the electric motor 334 and the power gearbox 336, by absorbing vibrations and other forces that would otherwise act on the electric motor 334 and/or the power gearbox 236. It should be appreciated, however, that in other exemplary embodiments, the first and/or second attachment assemblies 338, 340 may have any other suitable configuration for absorbing forces or vibrations between the electric motor 334 and the fan frame 308 or the power gearbox 336 and the fan frame 308. For example, in certain exemplary embodiments, the exemplary second attachment assembly 340 may be configured in substantially the same manner as one or more of the exemplary first attachment assemblies 338 described above with reference to FIGS. 5 through 7. Additionally, or alternatively, in other exemplary embodiments, the first attachment assembly 338 may be configured in substantially the same manner as the exemplary second attachment assembly 340 described with reference to FIG. 8. Further, in still other exemplary embodiments, the first and/or second attachment assemblies 338, 340 may be configured in any other suitable manner for absorbing torsional vibrations or other forces between the electric motor 334 or a power gearbox 336 and fan frame 308, or between the electric motor 334 or power gearbox 236 and structural member of an aircraft 10.

Referring still to FIG. 8, the exemplary driveshaft 332 depicted additionally includes a flexible element 335 for accommodating misalignment between the electric motor 334 and power gearbox 336. For the embodiment depicted, the flexible element 335 includes a bellow 376. More particularly, for the embodiment depicted, the flexible element 335 comprises a pair of bellows 376. Inclusion of the pair of bellows 376 may allow for the driveshaft 332 to accommodate an angular misalignment between the electric motor 334 and power gearbox 336, as well as a radial misalignment or axial displacement between electric motor 334 and power gearbox 336. The inventors of the present disclosure have discovered that inclusion of a driveshaft 332 in a BLI fan 300 in accordance with the present embodiment may allow for the BLI fan 300 to undergo certain maneuvers or withstand other forces that the BLI fan 300 may otherwise not be capable of withstanding.

It should be appreciated, however, that in other embodiments, the driveshaft 332 may include any other suitable flexible element 335. For example, referring now to FIG. 9, a close-up view is provided of an electric propulsion engine including a driveshaft 332 having a flexible element 335 in accordance with another exemplary embodiment of the present disclosure. The exemplary electric propulsion engine depicted in FIG. 9 may be a BLI fan 300 configured in substantially the same manner as the exemplary BLI fan 300 described above with reference to FIG. 4. Accordingly, the same or similar numbering may refer to the same or similar part. However, in other embodiments, the electric propulsion device may be configured in any other suitable manner.

Figure 9:
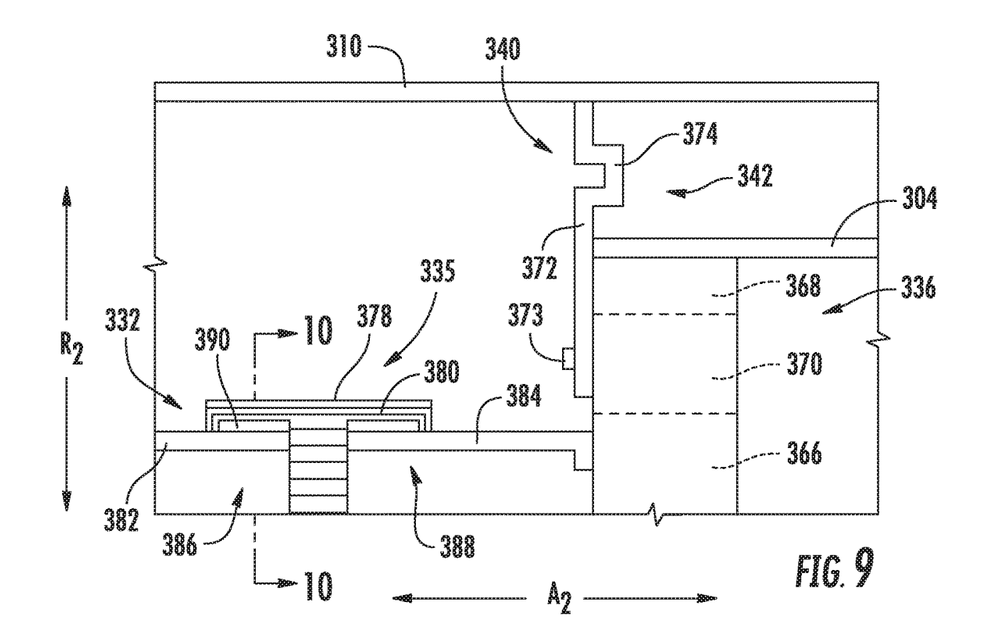
FIG. 9 is a close-up, schematic, cross-sectional view of a driveshaft in accordance with another exemplary embodiment of the present disclosure, as may be incorporated in the exemplary aft engine of FIG. 4.
Figure 10:
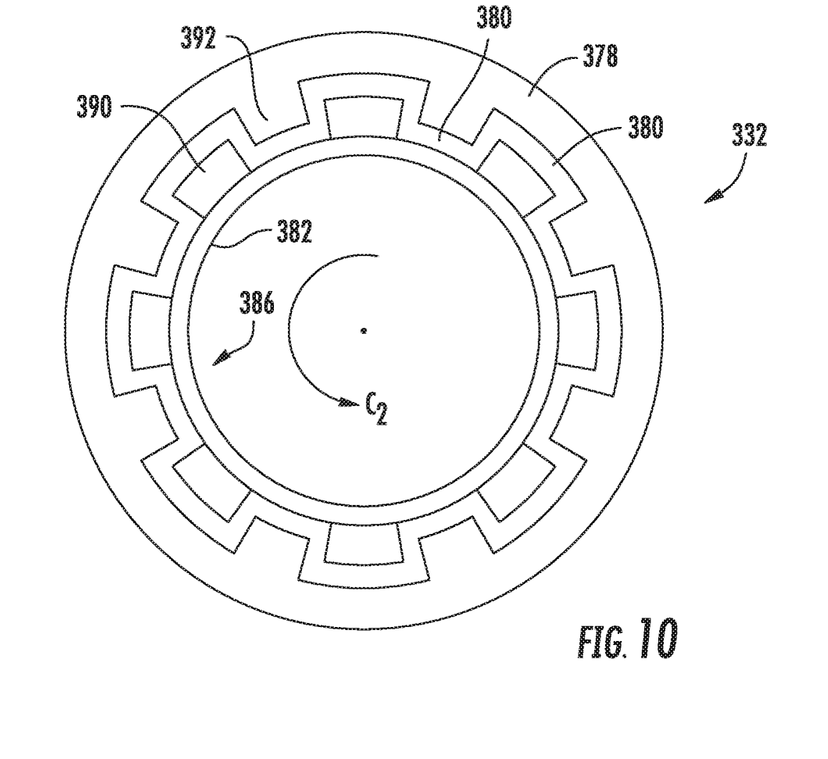
FIG. 10 is a schematic, cross-sectional view of a portion of the exemplary driveshaft of FIG. 9, taken along Line 10-10 in FIG. 9.

As depicted in FIG. 9, the exemplary BLI fan 300 defines an axial direction A2, a radial direction R2, and a circumferential direction C2 (see FIG. 10). Additionally, the BLI fan 300 generally includes an electric motor 334 (not shown) mechanically coupled to a driveshaft 332, the driveshaft 332 extending to and mechanically coupled to a power gearbox 336. The driveshaft 332 includes a flexible element 335 for accommodating a misalignment between the electric motor 334 and the power gearbox 336. Additionally, for the embodiment depicted, the flexible element 335 includes a torsional damper. More particularly, for the embodiment depicted, the flexible element 335 includes a splined shaft received within a splined coupling 378, and further includes a dampening material 380 positioned between the splined shaft and the splined coupling 378.

Specifically, for the embodiment depicted, the splined shaft of the flexible element 335 of the driveshaft 332 includes a forward segment 382 and a separate aft segment 384. The forward segment 382 of the driveshaft 332 includes a splined shaft section 386, and similarly, the aft segment 384 of the driveshaft 332 includes a splined shaft section 388. The splined shaft section 386 of the forward segment 382 of the driveshaft 332 is received within the splined coupling 378, and similarly the splined shaft section 388 of the aft segment 384 is also received within the splined coupling 378.

Referring now also to FIG. 10, providing a cross-sectional view of the driveshaft 332 taken along Line 10-10 of FIG. 9, the splined shaft section 386 of the forward segment 382 of the driveshaft 332 includes a plurality of axial teeth 390 extending outward generally along the radial direction R2, and spaced along the circumferential direction C2. Similarly, the splined coupling 378 includes a plurality of corresponding and complementary axial teeth 392 extending inwardly generally along the radial direction R2 and also spaced along the circumferential direction C2. The dampening material 380 extends between the axial teeth 390 of the splined shaft section 386 and the axial teeth 392 of the splined coupling 378 to absorb forces therebetween. As seen in FIG. 9, the splined shaft section 388 of the aft segment 384 also includes a plurality of axial teeth extending outward generally along the radial direction R2. In certain embodiments, the dampening material 380 may be a resilient material, such as an elastomeric material. However, in other embodiments, the dampening material 380 may be any other suitable material.

A driveshaft including a flexible material in accordance with the exemplary embodiment of FIGS. 9 and 10 may accommodate an angular misalignment between the electric motor 334 and power gearbox 336, as well as a radial misalignment or axial displacement between electric motor 334 and power gearbox 336. Further, including a driveshaft 332 having a flexible element 335 in accordance with the exemplary embodiment of FIGS. 9 and 10 may allow for the driveshaft 332 to absorb circumferential forces, i.e. torsional forces, between the power gearbox 336 and the electric motor 334. The inventors of the present disclosure have found that inclusion of a driveshaft 332 in a BLI fan 300 in accordance with the present embodiment may allow for the BLI fan 300 to undergo certain maneuvers or other forces that the BLI fan 300 may otherwise not be capable of withstanding.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft having a structural member, the propulsion system comprising:
an electric propulsion engine configured to be mounted to the aircraft, the electric propulsion engine defining a central axis and comprising:
a fan rotatable about the central axis of the electric propulsion engine and comprising a fan shaft;
a power gearbox mechanically coupled to the fan through the fan shaft;
an electric motor comprising a drive shaft, the electric motor coupled to the power gearbox through the drive shaft, the electric motor configured for rotating the fan through the power gearbox; and
a torsional damper coupled to the drive shaft, wherein the torsional damper includes a splined coupling and the drive shaft includes a forward segment and an aft segment positioned on opposing sides of the splined coupling, wherein the forward segment and the aft segment each comprise a splined portion at least partially received within the splined coupling of the torsional damper.

2. The propulsion system of claim 1, wherein the torsional damper further comprises a dampening material positioned between the forward and aft segments and the splined coupling.

3. The propulsion system of claim 2, wherein the dampening material comprises an elastomeric material.

4. The propulsion system of claim 1, wherein the electric propulsion engine is configured as a boundary layer ingestion fan.

5. The propulsion system of claim 1, wherein the electric propulsion engine is configured to be mounted to the aircraft along a mean line of the aircraft.

6. The propulsion system of claim 1, further comprising:
an attachment assembly operably coupled to at least one of the electric motor or the power gearbox.

7. The propulsion system of claim 6, wherein the electric propulsion engine further comprises a fan frame, and wherein the attachment assembly is configured to mount the electric motor to at least one of the fan frame or the structural member of the aircraft.

8. The propulsion system of claim 7, wherein the electric propulsion engine defines an axial direction, a radial direction, and a circumferential direction, and wherein the torsional damper provides dampening along each of the axial direction, the radial direction, and the circumferential direction of the electric propulsion engine.

9. A boundary layer ingestion system for mounting to an aircraft having an aft end and a structural member, the boundary layer ingestion system comprising:
a fan rotatable about a central axis of the boundary layer ingestion system and comprising a fan shaft;
a power gearbox mechanically coupled to the fan through the fan shaft;
a drive shaft coupled to an electrical motor and to the power gearbox on opposing sides thereof, the electric motor configured for rotating the fan through the power gearbox and the drive shaft; and
a torsional damper including a splined coupling positioned between a forward segment and an aft segment of the drive shaft, wherein the forward segment and the aft segment each comprise a splined portion at least partially received within the splined coupling of the torsional damper, wherein the splined coupling is positioned radially about and externally of the forward segment and the aft segment with the splined coupling further extending axially along each of the forward segment and the aft segment, and wherein the torsional damper further comprises a dampening material positioned between the forward and aft segments and the splined coupling.

10. The boundary layer ingestion system of claim 9, wherein the dampening material comprises an elastomeric material.

11. The boundary layer ingestion system of claim 9, wherein the boundary layer ingestion system is configured to be mounted at the aft end of the aircraft.

12. A propulsion system for an aircraft having a structural member, the propulsion system comprising:
an electric propulsion engine configured to be mounted to the aircraft, the electric propulsion engine defining a central axis and comprising:

a fan rotatable about the central axis of the electric propulsion engine and comprising a fan shaft;

a power gearbox mechanically coupled to the fan through the fan shaft;

an electric motor comprising a drive shaft, the electric motor coupled to the power gearbox through the drive shaft, the electric motor configured for rotating the fan through the power gearbox; and a torsional damper coupled to the drive shaft, wherein the torsional damper includes a splined coupling and the drive shaft includes a forward segment and an aft segment positioned on opposing sides of the splined coupling, wherein the forward segment and the aft segment each comprise a splined portion at least partially received within the splined coupling, and wherein the torsional damper further comprises a dampening material positioned between the forward and aft segments and the splined coupling.

* * * * *